(12) United States Patent
Guo et al.

(10) Patent No.: US 8,665,930 B2
(45) Date of Patent: Mar. 4, 2014

(54) SYSTEM AND METHOD FOR CHANNEL STATUS INFORMATION FEEDBACK IN A WIRELESS COMMUNICATIONS SYSTEM THAT UTILIZES MULTIPLE-INPUT MULTIPLE-OUTPUT (MIMO) TRANSMISSION

(75) Inventors: Shiguang Guo, Kanata (CA); Hua Xu, Kanata (CA); Yongkang Jia, Kanata (CA); Dongsheng Yu, Kanata (CA); Alireza Bayesteh, Waterloo (CA); Shiwei Gao, Kanata (CA)

(73) Assignee: BlackBerry Limited, Waterloo (CA)

( * ) Notice: Subject to any disclaimer, the term of this patent is extended or adjusted under 35 U.S.C. 154(b) by 864 days.

(21) Appl. No.: 12/707,223

(22) Filed: Feb. 17, 2010

(65) Prior Publication Data

US 2011/0200081 A1 Aug. 18, 2011

(51) Int. Cl.
*H04B 1/38* (2006.01)
*H04L 27/06* (2006.01)

(52) U.S. Cl.
USPC .......................... 375/220; 375/221; 375/340

(58) Field of Classification Search
USPC ......... 375/211, 219, 220, 221, 222, 229, 295, 375/296, 316, 340
See application file for complete search history.

(56) References Cited

U.S. PATENT DOCUMENTS

| | | | |
|---|---|---|---|
| 2006/0155798 A1* | 7/2006 | Ketchum et al. | 708/607 |
| 2008/0233965 A1* | 9/2008 | Kent et al. | 455/450 |
| 2008/0316935 A1 | 12/2008 | Bala et al. | |
| 2009/0086842 A1 | 4/2009 | Shi et al. | |
| 2012/0033566 A1* | 2/2012 | Porat et al. | 370/252 |

FOREIGN PATENT DOCUMENTS

| | | |
|---|---|---|
| EP | 2187533 A1 | 5/2010 |
| EP | 2282431 A2 | 2/2011 |
| WO | 2008021062 A1 | 2/2008 |
| WO | 2009061115 A2 | 5/2009 |
| WO | 2010025426 A1 | 3/2010 |

OTHER PUBLICATIONS

EP Patent Application No. EP10153899, Extended European Search Report dated Jul. 8, 2010.
Motorola: "SCF-based Coordinated Beamforming and Performance Gain over Single-Point SU/MU Beamforming" 3GPP Draft; R1-094848 SCF Based COBF and Results—Final, 3rd Generation Partnership Project (3GPP), Mobile Competence Centre; Nov. 9, 2009, XP050389236—Section 5.
NXP Semiconductors et al: "Feedback and Precoding Techniques for MU-MIMO for LTE-A" 3GPP Draft; R1-083774, 3rd Generation Partnership Project (3GPP), Mobile Competence Centre; Sep. 25, 2008, XP050317109—Section 4.2.

(Continued)

*Primary Examiner* — Sam K Ahn
*Assistant Examiner* — Linda Wong
(74) *Attorney, Agent, or Firm* — Moffat & Co.

(57) ABSTRACT

A method for user equipment operation in a wireless communication system, the wireless communication system having an base station, the method comprising measuring a channel between the UE and the base station, determining a quantized estimate using a codebook to approximate the measured channel, computing an error measure for the quantized estimate and transmitting the error measure and the quantized estimate to the base station for use by the base station in reconstructing an actual channel vector.

20 Claims, 9 Drawing Sheets

(56) References Cited

OTHER PUBLICATIONS

EP application No. 12151001.0, Extended European Search Report, dated Feb. 22, 2012.

PCT application No. PCT/CA2011/000162, International Search Report dated May 17, 2011.

PCT application No. PCT/CA2011/000162, Written Opinion of the International Searching Authority dated May 17, 2011.

* cited by examiner

FIG 2

| Codebook index 201 | $u_i$ 202 | Number of layers M 204 | | | |
|---|---|---|---|---|---|
| | | 1 | 2 | 3 | 4 |
| 0 | $u_0=[1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1=[1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2=[1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3=[1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4=[1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5=[1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6=[1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7=[1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8=[1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9=[1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10}=[1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11}=[1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12}=[1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13}=[1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14}=[1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15}=[1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

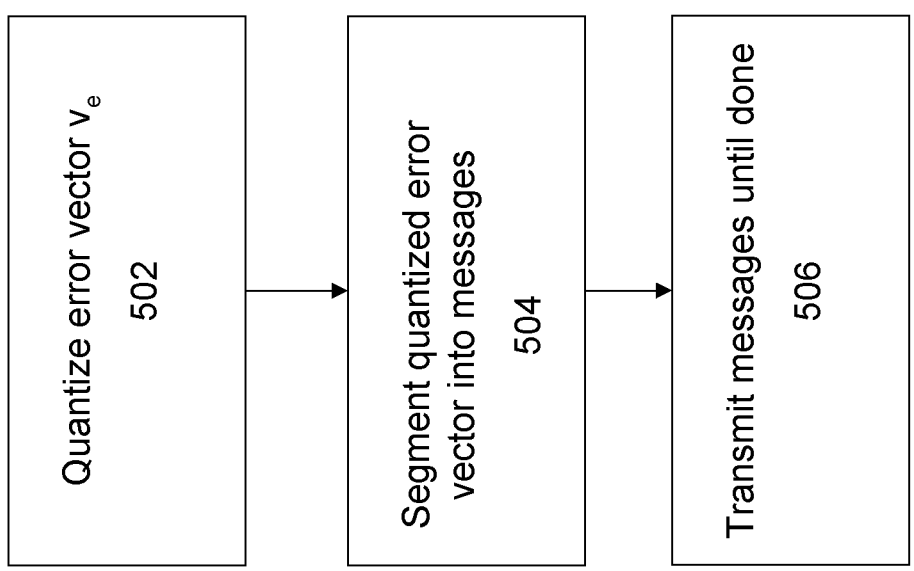

700

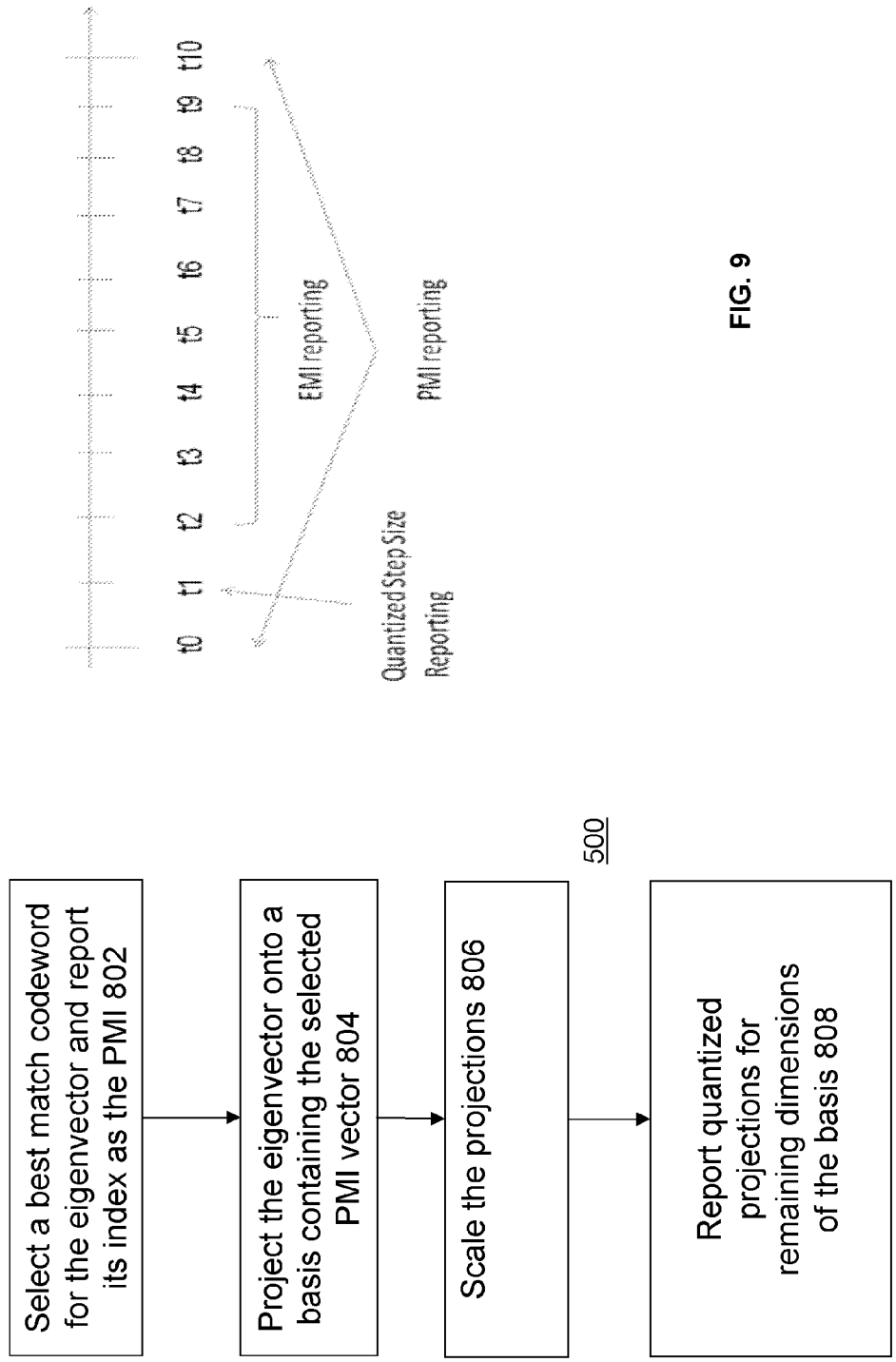

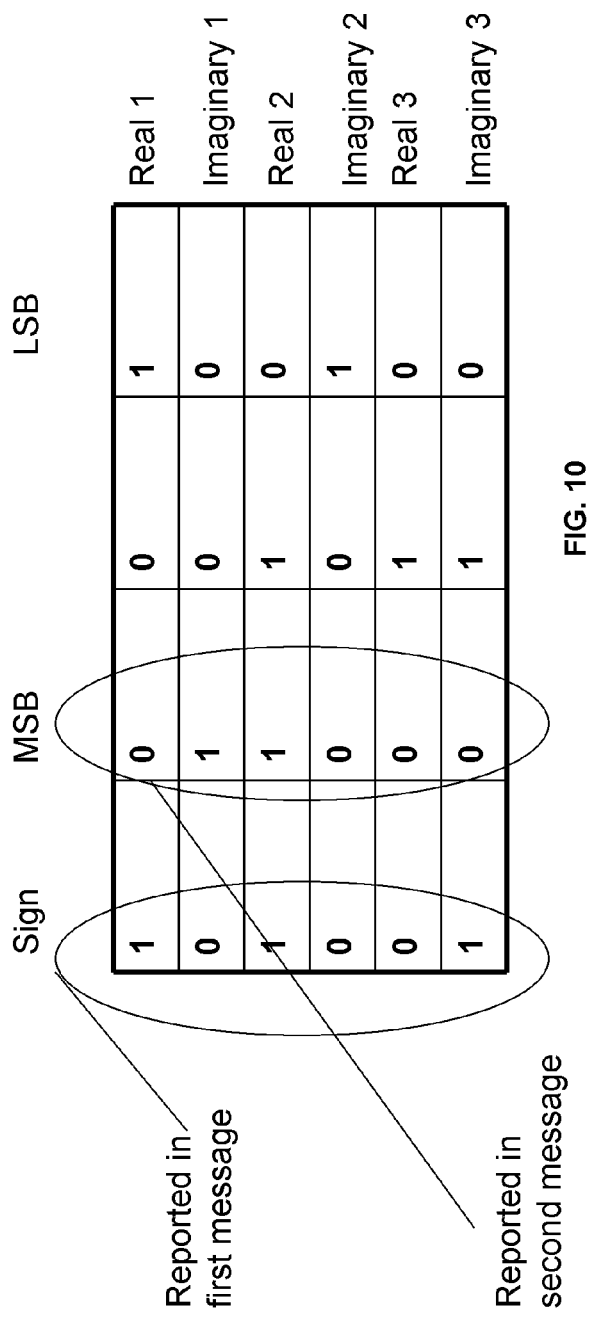
FIG. 10
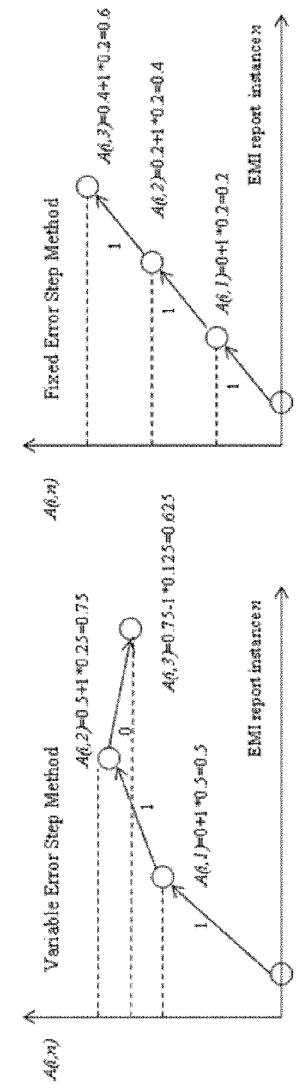
FIG. 11a
FIG. 11b

SYSTEM AND METHOD FOR CHANNEL STATUS INFORMATION FEEDBACK IN A WIRELESS COMMUNICATIONS SYSTEM THAT UTILIZES MULTIPLE-INPUT MULTIPLE-OUTPUT (MIMO) TRANSMISSION

FIELD OF THE DISCLOSURE

The present disclosure relates to wireless communication systems, and more particularly to a system and method for channel status information (CSI) feedback in a wireless communications system that utilizes multiple spatial channels.

BACKGROUND

The third generation partnership project (3GPP) is directed towards the advancement of technology for radio interfaces and network architectures for wireless communication systems. Multiple-input, multiple-output (MIMO) techniques have been introduced as one of the key approaches to increase the peak data rate, average throughput, and system performance in 3GPP LTE (long term evolution).

DL MU-MIMO (downlink multi-user MIMO) provides a substantial gain in DL communications throughput (i.e. DL capacity) by allowing base stations (in LTE termed evolved Node B or eNB) to transmit information intended for the multiple users on the same physical time-frequency resources. DL MU-MIMO transmission is supported by 3GPP LTE Release 8 (Rel-8) and is a potential technique with some enhancements in LTE-Advanced (Rel-10).

Performance of MIMO techniques, particularly MU-MIMO, is largely dependent on the availability of accurate channel state information (CSI) at the transmitter (CSIT).

The receiver at the UE (User Equipment) estimates the CSI by using reference symbols and could usually obtain an accurate representation of the CSI. Efficient feedback of this CSI determined at the receiver (CSIR) of the UE to the transmitter at the eNB is important for DL MU-MIMO performance, particularly for an FDD (frequency division duplex) system.

Several feedback schemes have been proposed or implemented for reporting CSI from the UE receiver to the transmitter at the eNB on an uplink (UL) channel. These feedback schemes can be characterized as different types of CSI compression techniques.

One scheme is the feedback of a channel covariance matrix (COVM). In practice, the COVM is obtained through averaging channel state information over frequency and/or time domains. It retains all rank information as well as large-scale fading spatial spectrum information, including angle of departure (AOD) and power. Long term averaging may be used to reduce the UL feedback overhead. However, small scale fading information is lost in this case. This approach quantizes each complex element of the COVM and could result in a large feedback overhead.

Another scheme is the principal eigenvector feedback, in which only one (the principal) eigenvector of the channel matrix is reported to the transmitter. This may be viewed as a further compression of the channel COVM. While, the principal eigenvector is a good approximation of the COVM in highly correlated channels, in an uncorrelated channel with higher rank, this approximation will lose information on non-principal ranks. It is similar to COVM feedback scheme, but with fewer elements to be quantized and reported.

In 3GPP LTE Rel-8, a codebook based precoding scheme with limited-CSI feedback is adopted based on a predefined codebook in which a set of codewords is defined based on the Householder (HH) transform. The UE reports the index of the codeword, or so-called precoding matrix index (PMI) at each reporting instance. This scheme has a low feedback overhead compared with the other schemes as mentioned above.

In the codebook based scheme, a UE estimates its channels and quantizes the estimated channels by using a codebook. At the UE a codeword with the best representation of the measured normalized channel is selected from the codebook and the index of the selected codeword, or the PMI, is then fed back from the UE to the eNB transmitter.

The amount of quantization error in the PMI feedback approach depends on codebook size and specific codebook design. Quantization error is more tolerable for single-user MIMO (SU-MIMO), but could degrade MU-MIMO performance significantly. Quantization error could be reduced by using a larger sized codebook, however, it may be impractical to use a very large codebook as it requires a large storage space at both the UE and the eNB as well as more processing time for codebook searching. Moreover, using a large codebook would lead to undesirably large feedback overhead.

BRIEF DESCRIPTION OF THE DRAWINGS

The present disclosure will be better understood with reference to drawings in which:

FIG. 2 shows an example precoding codebook for transmission on four antennas

FIG. 5 is a flow chart for reporting of the quantization error vector according to an embodiment of the present matter;

FIG. 6 shows an example transform based codebook;

FIG. 8 is a flow chart for generating an error vector according to an embodiment of the present matter;

FIG. 9 is a graphical representation of a timeline for reporting of error vectors according to an embodiment of the present matter;

FIG. 10 is a graphical representation showing the reporting of a sequence of bits of the quantized error;

FIGS. 11a and 11b are graphs showing the error converging with variable or fixed step sizes according to embodiments of the present matter;

DETAILED DESCRIPTION

Figure 1:
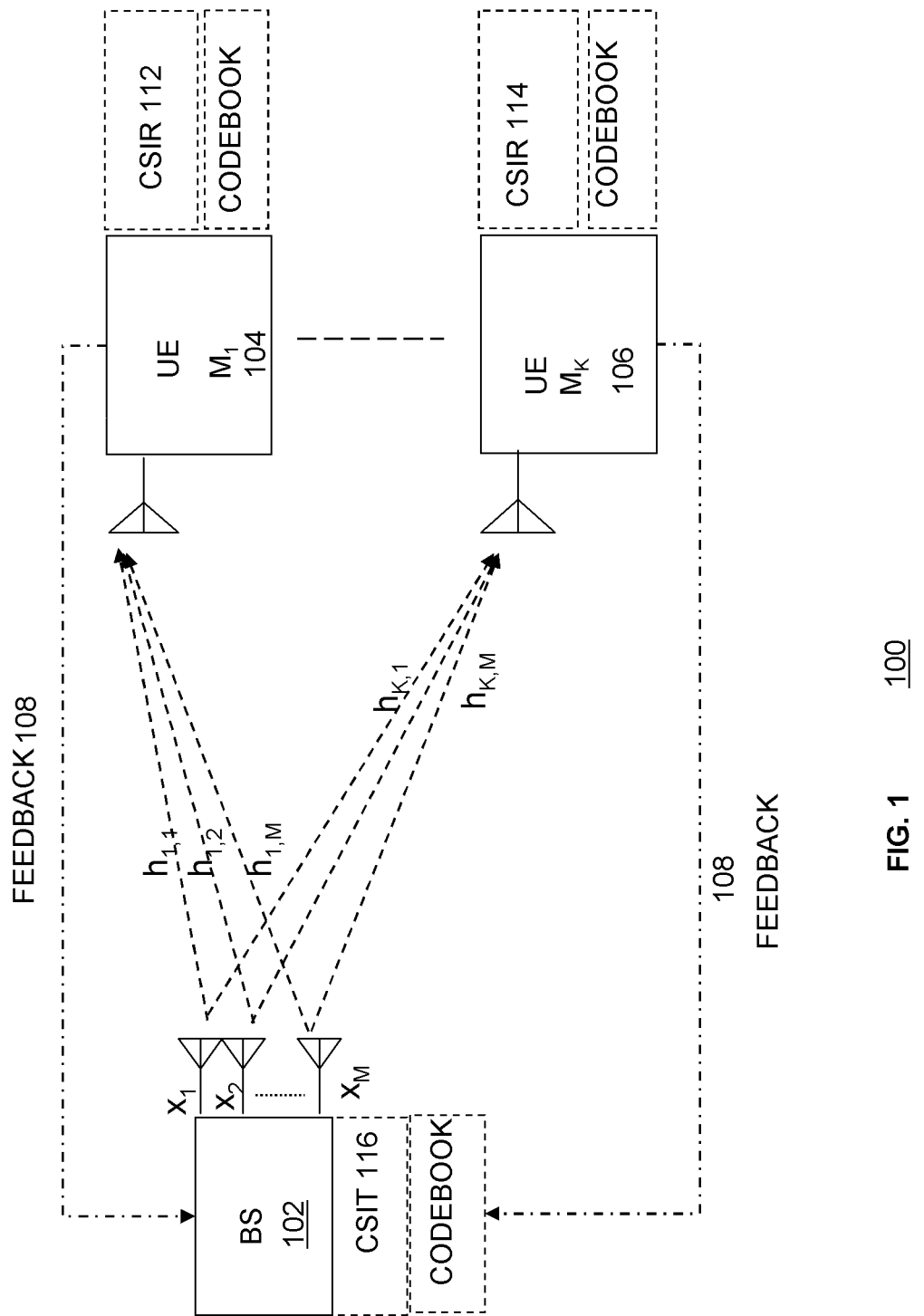
FIG. 1 is a block diagram illustrating an exemplary system architecture for a LTE MIMO communication system.

When referred to herein, the terminology user equipment (UE) includes but is not limited to a wireless transmit/receive unit (WTRU), a mobile station, a fixed or mobile subscriber unit, a pager, a cellular telephone, a personal digital assistant (PDA), a computer, or any other type of user device capable of operating in a wireless environment.

When referred to herein, the terminology "eNB" includes but is not limited to a Node-B, a base station, a site controller, an access point (AP), or any other type of interfacing device capable of operating in a wireless environment.

The present disclosure provides a feedback method for feedback of CSI from a UE to an base station for MIMO transmission. The feedback method may be used with current feedback schemes such as that described in LTE Rel-8, and may reduce the channel quantization error induced by the codebook-based methods as for example described in Rel-8.

The present disclosure describes a feedback method which provides a more accurate feedback of CSIR for use by an base station scheduler and its MIMO precoder, for improving DL MIMO performance, particularly for MU-MIMO transmission.

In general, the present method quantizes an error vector in a quantized CSI to form one or more error measure indicator (EMI) messages, each including quantization error information for the quantized CSI.

The quantized CSI may be reported by a typical PMI based feedback scheme. The EMI messages may then be fed back to the base station and could be used with the reported CSI to improve the accuracy of a reconstructed CSI at the base station. Furthermore, the present approach may reduce feedback overhead by using a fewer number of bits to represent each of the EMI messages The EMI messages allow more accurate reconstruction of a principal eigenvector of an actual channel matrix at the base station.

Still further the EMI messages may be progressively reported to the base station. The number of EMI reports may be configurable and EMI reporting could be done incrementally. The more EMI reports an base station receives, the more accurate CSI it could reconstruct.

Conversely, if the increased signaling overhead due to EMI reporting cannot be tolerated, the EMI reporting can be balanced by reducing conventional PMI reporting frequency. For example, in low mobility and highly correlated scenarios, where channel variation is small, the EMI report provides more value than the PMI report as the PMI may not change much. Therefore, PMI reporting with a longer report period is acceptable. This reduction in usage of UL signaling can be used instead for the EMI reporting. As low mobility and high correlation are also the scenarios where DL MU-MIMO could be deployed, the use of an EMI may allow the base station to improve DL MU-MIMO performance.

A rank-1 channel is assumed in the following description for simplicity. However the description may be extended to multiple-rank channels.

In accordance with one aspect of the present matter there is provided a method for user equipment operation in a wireless communication system, the wireless communication system having an base station, the method comprising measuring a channel between the UE and the base station, determining a quantized estimate using a codebook to approximate the measured channel, computing an error measure for the quantized estimate and transmitting the error measure and the quantized estimate to the base station for use by the base station in reconstructing an actual channel vector In accordance with one aspect the error measure includes information of which basis and which dimension in the basis are selected as a quantized channel estimate, and the error measure contain remaining basis dimensions information and said projections onto said remaining basis dimensions.

In accordance with another aspect of the present matter there is a provided a method for base station operation in a wireless communication system comprising receiving at the base station an error measure and a quantized estimate of a channel from an EU, the quantized estimate being a codebook based approximation of a measured channel between the UE and the base station, the error measure being an error vector corresponding to a difference between the quantized estimate and the measured channel; and reconstructing the channel at the base station by applying the error measure to the quantized estimate to derive a channel vector between the base station and the UE.

In accordance with a still further aspect there is provided a mobile device for operation in a wireless communication system, the wireless communication system having an base station, the mobile device comprising a processor configured for:

measuring a channel between the UE and the base station; determining a quantized estimate using a codebook to approximate the measured channel; computing an error measure for the quantized estimate; and transmitting the error measure and the quantized estimate to the base station for use by the base station in reconstructing an actual channel vector.

In accordance with a still further aspect there is provided a MIMO system comprising a mobile device, having a processor configured for: measuring a channel between the mobile device and a base station; determining a quantized estimate using a codebook to approximate the measured channel; computing an error measure for the quantized estimate; and transmitting the error measure and the quantized estimate to the base station for use by the base station in reconstructing an actual channel vector.

There is further provided in the system, wherein the base station includes a processor and communication subsystem configured for: receiving at the base station the error measure and the quantized estimate of the channel from the mobile device; and reconstructing a representation of the actual channel vector at the base station by applying the error measure to the quantized estimate.

The system further provides for the use by the base station of the actual channel vector in MIMO communications.

Referring to FIG. 1 there is shown a schematic representation of an example DL MU-MIMO mobile communication system with feedback 100. As mentioned, the communication system 100, according to one embodiment, is an LTE or LTE-Advanced system. The system includes a base station (BS) or called an eNB in LTE 102 and a plurality of independent mobile user terminals (UE's) 104,106 distributed within wireless covering range of the base station. The eNB is equipped with a plurality of antennas and each of the UE's are equipped with one antenna coupled to appropriate receivers and processing circuitry. It is to be noted that a single UE antenna is illustrated for simplicity and ease of description; however a UE could have more than one antenna in which case the mathematical representations described below would extend to matrix operations.

As is well known to those skilled in the art, DL MU-MIMO, also known as a MIMO broadcast system with feedback is organized as follows. The eNB is assumed to be equipped with M transmitting antennas, transmits independent messages to K UEs' (i.e., receivers). Each of these K receivers is equipped with one or more antennas (one antenna is exemplified). In particular, the eNB transmits signal $x_j$ from the j-th antenna where $x_j$ is from the set of complex numbers. Thus, an eNB with M antennas transmits a vector $x=(x_1, \ldots, x_M)$ at any given instance.

During transmission from the j-th antenna to the k-th UE, the effect of channel on the transmitted signal $x_j$ is modeled by multiplying it with a channel coefficient $h_{k,j}$. As is well known to those of ordinary skill in the art, the channel coefficient of a mobile communications channel represents the effect of the environment on the transmitted signal. Thus, for a UE with one antenna, when the vector x is transmitted by the eNB, the UE k actually receives the signal $y_k = h_k x + n_k$, where $h_k = (h_{k,1}, \ldots, h_{k,M})$ is a row vector containing channel coefficients from all transmit antennas of the eNB to the receive antenna of the k-th UE, and $n_k$ contains additive Gaussian white noise and interference. For a UE with multiple antennas the channel vector $h_k$ is a matrix and is termed a channel matrix H As is well known the eNB may send well defined reference symbols to the UE's and the UE uses these reference symbols to measure their respective channel vectors $h_k$, from the eNB. Next, the k-th mobile terminal (k=1, . . . , K) determines a quantized version of the measured channel vector $h_k$, typically by selecting a codeword in the predefined codebook that best represents the normalized measured channel vector. The codebook is normally pre-determined and known to each of the UE's and also to the eNB and could be represented by, $C=\{c_1, c_2 \ldots, c_r\}$ where each of codebook entries comprises an M-element complex vector for rank-1 transmission. The selected codeword is used to represent (i.e., by approximating) the actual (i.e., as measured) channel vector. In particular, the k-th UE determines the index $t_k$ of the selected codeword and thus as mentioned above, the selected codeword is a "quantized" (i.e., approximated) version of the channel vector $h_k$.

After the k-th mobile terminal has selected a codeword to represent its channel vector, it transmits the index (PMI) thereof, $t_k$, back to the eNB, thereby indicating to the eNB the (approximate) value of the normalized measured channel vector $h_k$. That is, since the codebook used by the UEs is pre-determined and is also known by the eNB, the indices $t_k$, would allow the eNB to reconstruct the quantized versions of the channel vectors $h_k$, for the k-th UE. An eNB employing DL MU-MIMO broadcast techniques would then choose a subset of L UEs from among the K UEs and schedule corresponding transmissions to the UEs in MU-MIMO transmission. The selection of such UE could be based on performance criteria, e.g., minimizing inter-user interference or maximizing system throughput, and such performance criteria would use the information of the reconstructed channel vectors at the eNB. As noted the above discussion pertains to a single antenna receiver, for UEs with multiple receive antennas, the receiver estimates a channel matrix H, based on the reference signals and finds a codeword, which may be with a single rank or multiple-rank, in the pre-determined codebook that best matches the measured channel matrix, and feeds back the index of such codeword(s) (PMI) to the eNB. The NB may follow the similar procedure as described above to select a number of UEs in MU-MIMO transmission.

Referring to FIG. 2 there is shown a tabular representation of a precoding codebook for transmission on four antennas as defined in LTE Rel-8. In FIG. 2 the first column 201 denotes the codebook index and the second column 202 denotes the unit vector ($u_i$), which is used to construct a Householder matrix $W_i$ with equation $W_i = I - 2u_i u_i^H / u_i^H u_i$. The third column 204 ($W_i^{\{j\}}$) in the table denotes the $j^{th}$ column of the Householder matrix constructed using the $i^{th}$ unit vector $u_i$. As mentioned earlier, in LTE Rel-8 the UE is specified to report the index of the codeword, as a 4-bit value (called a label) or the so-called PMI at each reporting time. Codebook entries for multilayer transmission are also shown in FIG. 2. Although a LTE Rel-8 codebook is illustrated it is appreciated that other codebooks may be used.

Figure 3:
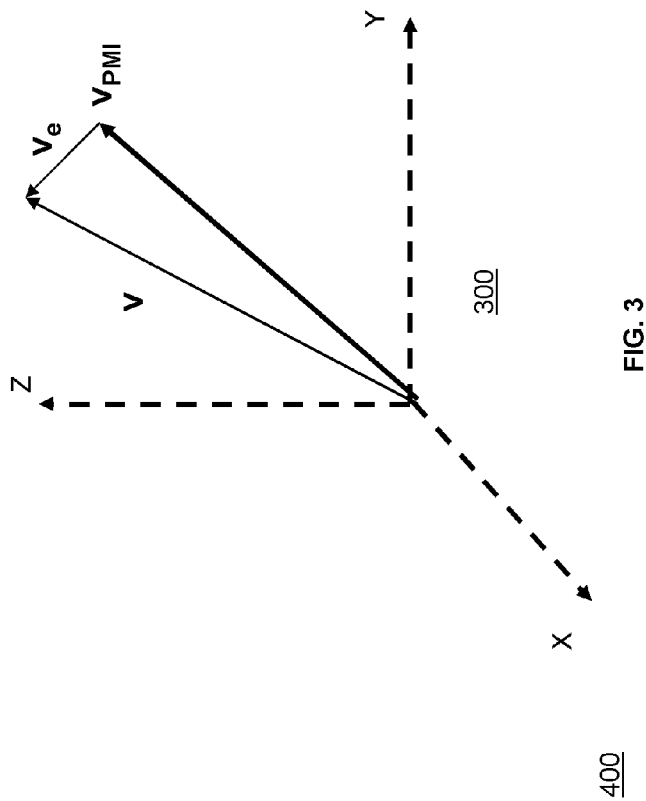
FIG. 3 is graphically representation of quantization error vector in a PMI feedback approach.

As seen from the above, given a limited number of codewords (sixteen in FIG. 2 as an example) the quantization error is introduced by approximating the actual channel vector with a codeword in codebook. This error is shown graphically in FIG. 3, using a three-dimensional real vector as an example. In FIG. 3, a quantized vector $v_{PMI}$ is represented in the three dimensional real vector space along with an actual measured channel vector v and an error vector $v_e$. The error vector $v_e$ represents the quantization error between the quantized vector, or codeword vector $v_{PMI}$ and the measured channel vector v.

By having information representing this error vector $v_e$ fed back to the eNB as an error measure indicator (EMI), the eNB may then use this EMI along with the PMI to reconstruct more accurate channel information for scheduling and applying more accurate precoding for MIMO transmission.

The EMI information representing the error vector $v_e$ may be fed back (reporting) using different techniques. It is preferable that these techniques minimize feedback overhead while achieving a desired performance. In addition, techniques should be compatible with or complement existing feedback mechanisms, such as existing Rel-8 type of PMI feedback scheme. The eNB can construct a more accurate channel vector (or the principal eigenvector) by combining the error vector $v_e$ reports and the codeword indicated by the PMI feedback. Multiple techniques may be used to represent this quantization error to the eNB.

Figure 4:
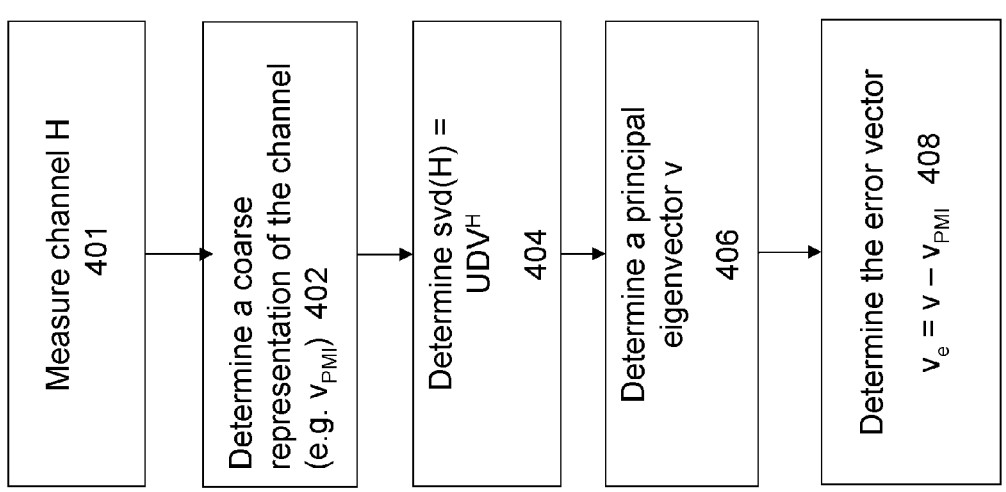
FIG. 4 is a flow chart for determining quantization error according to an embodiment of the present matter.

For example, referring to FIG. 4 there is shown a flow chart 400 for determining quantization error according to an embodiment of the present matter. The following discussion will assume more than one receiver antenna. As is well known in the art the UE measures the channel matrix H 401 using known circuitry. Next a coarse approximation 402 of the channel vector is determined by selecting a codeword from the codebook in a known manner. For example the determination of $v_{pmi}$ is defined in Rel 8. An eigenvector of the channel is determined. This is performed by using for example by a SVD (singular value decomposition) of H 404 or by using its covariance matrix. Recall that in the present embodiment we are assuming rank-1 transmission so the principal eigenvector may represent the actual channel vector, but there may be more than one eigenvector of the channel matrix H in higher rank transmissions. That is for a rank-1 transmission the principal eigenvector may best represent the channel. In effect, the codeword (index) to be reported is the quantized version of the actual principal eigenvector taken from the SVD (singular value decomposition) of the channel matrix H. That is if the channel matrix H measured at UE is an N-by-M matrix (M transmit antennas at the eNB and N receive antennas at a UE) it may be factorized using SVD as follows:

$$H = UDV^H$$

where U is an N-by-N unitary matrix, the matrix D is N-by-M diagonal matrix indicating channel quality with nonnegative real numbers on the diagonal, and $V^H$ denotes the conjugate transpose (Hermitian) of V, an M-by-M unitary matrix. A common convention is to order the diagonal entries $D_{i,i}$ in descending order. The diagonal entries of D are also known as the singular value of H. The columns of V are the right singular vectors of channel matrix H and the eigenvectors of $H^H H$.

Accordingly, at 406 after recoding $D_{i,i}$, the principal eigenvector v could be obtained from the first column of the unitary matrix V. As mentioned above at 402 the closest codeword, denoted as $v_{PMI}$, in the codebook, to the channel vector or principal eigenvector v in this case, is determined by searching through the codebook. The closest codeword is determined by for example:

$$v_{PMI} = \underset{v \in codebook}{\operatorname{argmax}} \|Hv\|^2,$$

where $\|\cdot\|^2$ denotes the matrix or vector norm two operation. The error vector $v_e$, is then obtained 408 by calculating the difference between the codeword $v_{PMI}$ and the principal eigenvector.

As mentioned above this error vector $v_e$ is to be sent back to the eNB as an EMI. Referring to FIG. 5 there is shown a flow chart 500 of an embodiment for feedback or reporting of the EMI, wherein the error vector $v_e$ is generated directly by taking the difference between the principal eigenvector v and its best matching codeword $v_{PMI}$ from the codebook. In the case of a 4-TX antenna DL MIMO with one layer per UE, the error vector $v_e$ is a 4-by-1 vector with complex entries, which consists of eight real numbers. In a direct reporting mode, the UE will thus report eight real numbers for the error vector $v_e$ by quantizing the error vector in binary format, 502 and segmenting 504 the quantized information in multiple messages, and reporting the messages, at 506, which are carried by the EMI.

In another embodiment, the EMI may be reported by compressing the error vector $v_e$ by for example removing redundancy in the feedback information. As any vector can be represented with a new orthogonal basis by projecting itself to this new basis, instead of reporting the generated error vector $v_e$ directly, the vector may be transformed onto a new orthogonal basis, and the transformed vector is then quantized and reported. An appropriate normalization as $v=v/(v_{PMI}^H v)$ can be used to make the error vector $v_e$ orthogonal to the $v_{PMI}$. In accordance with an embodiment of the present matter, with this appropriate eigenvector normalization, the principal eigenvector could be projected to a new basis, which includes the PMI selected dimension whose projection represent the coarse approximation of the eigenvector; while the rest dimensions orthogonal to the dimension selected by PMI, contains projections representing the error vector. By applying such basis transforms, the number of dimensions on which error vector are projected is reduced by one, this results in reduced reporting overhead.

A notional 4-by-4 matrix, as illustrated in FIG. 6 can be used to explain such transformation using the Rel-8 codebook as example. The codebook is used for transmission on four antennas and is divided into four groups. Each value in the table represents the index of a codeword. Each group, is represented by a row in the table and consists of four codeword vectors, which are orthogonal to each other and have unitary norm, and thus each group forms an orthogonal basis.

In the above example, there are four sets of basis. We can represent a vector using any one of these basis sets. If the selected set of basis is the one that contains the selected PMI codeword vector, the eigenvector will have maximal projection on a dimension corresponding to the selected codeword, while the projections on the other dimensions of the basis will be small. By feedback dominant one-dimensional PMI report representing the coarse approximation of the channel eigenvector as defined in Rel-8, the projections on the other dimensions can be reported to the transmitter as additional quantization errors to allow the eNB to reconstruct a more refined channel vector or principal eigenvector. As the projections on the other dimensions are relatively small, meaning small dynamic range, fewer numbers of bits are needed to report this kind of refinements while maintaining the same quantization precision.

Figure 7:
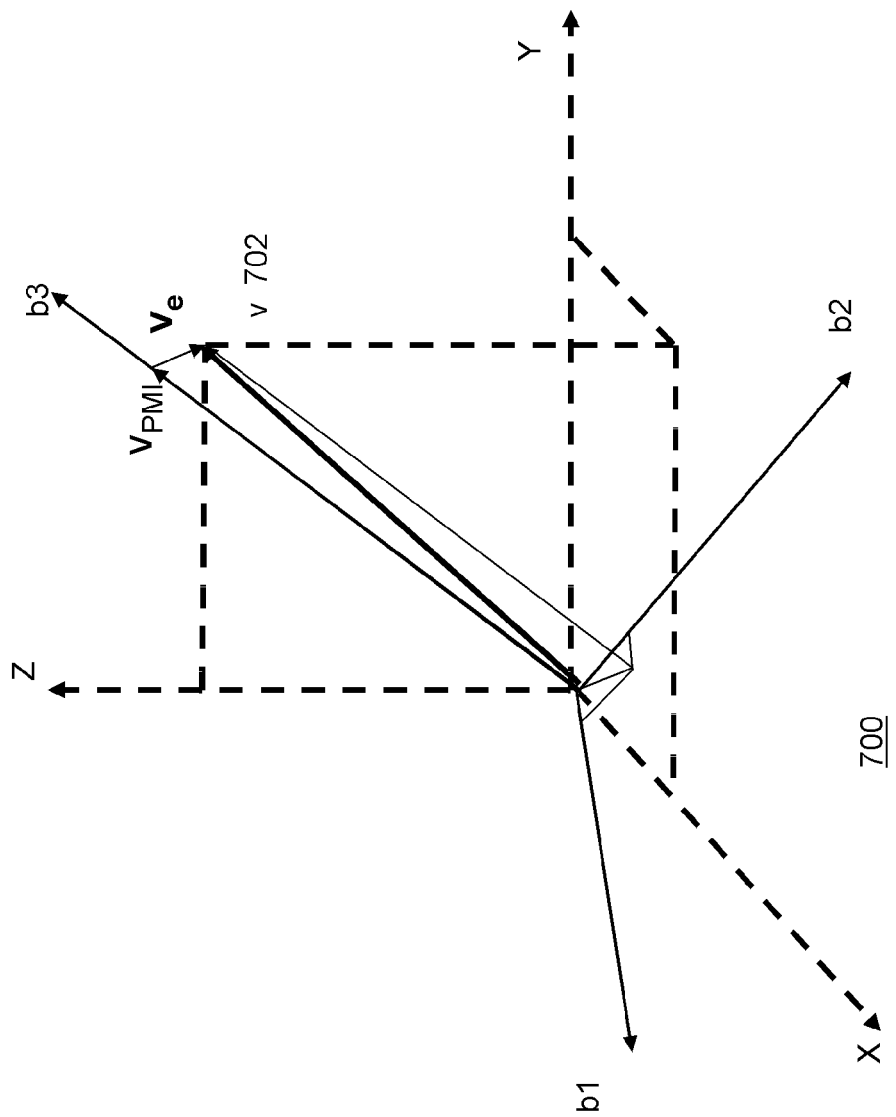
FIG. 7 is a graphical representation of basis transformation according to an embodiment of the present matter.

Referring to FIG. 7, there is illustratively shown a basis transformation 700 for a three-dimensional real vector space. A vector v 702 represents the eigenvector, which can be projected into two sets of basis. The first one is represented by [x y z] and the second one is represented by a new basis [b1 b2 b3]. The PMI codeword vector that is selected may be represented as one of the basis vectors b3 of the new basis. The eigenvector v can be represented by a projection on the new basis [b1 b2 b3] within which the codeword pointed to by PMI, $v_{PMI}$, is located, and forms the dominant projection.

Where the vector space is an M-dimensional complex space (such as for a codebook specified by LTE) where M is the number of TX antennas. The projection of the vector v can be represented as:

$$v = BB^H v = \sum_i b(i)b(i)^H v = \sum_i (b(i)^H v)b(i) = \sum_i A(i)b(i),$$

$$A(i) \in C(i = 1 \ldots M)$$

where v is the eigenvector, B is a transformation matrix with column vectors b(i) representing the basis vectors, the multiplication of B and its transpose conjugate is an identity matrix, A(i) are the projection values on the new basis for dimension i and M is the dimension size. After this projection on the new basis, all projection values A(i) (i=1, ..., M) are scaled so that the norm of the dominant projection, which corresponds to the PMI selected dimension, equals to one. After the PMI is reported, both the UE and eNB know which basis is used (the basis which contains the PMI) and which dimension in the basis is selected as the PMI. The remaining projection values A(i) may be reported in a manner described later.

Referring to the 4-TX antennas example, as the PMI could be reported separately in a similar manner as in Rel-8, it may be seen that only three complex values, namely A(i), or six real values, need to be reported for the remaining projections. This reduces the number of feedback bits compared with the direct reporting approach mentioned earlier without basis transformation, where four complex values or eight real values are reported.

Referring to FIG. 8 there is shown a flow chart 800 for the error vector or EMI generation procedure described above. At a step 802 a basis transform procedure begins, by the UE selecting the best matching codeword for the eigenvector and reporting this codeword PMI to the eNB in a manner as for example specified in Rel-8. At step 804 the eigenvector is projected to the basis, which contains the selected PMI. The projections on the basis are scaled at step 806 by a factor such that the projection to the dimension of the selected PMI is one. Next error vector reporting is performed by reporting quantized projections 808 for the remaining dimensions of the basis (other than the selected PMI) to the eNB.

Although the eNB would receive PMI reporting from UE as described in Rel-8, the eNB could further configure additional reporting of error vector and use them to refine the construction of eigenvectors based on the PMI and EMI. Note that after the eNB combines the PMI and the EMI reports from the UE, the combined vector should be normalized to a norm of one.

Referring to FIG. 9, there is shown a time line graphically illustrating feedback of the generated error vectors (matrix) in EMI, which may be included in addition to legacy PMI reporting messages specified in Rel-8. The EMI messages allow an eNB to perform eigenvector refinement during reconstruction. This reporting step may be optional in order to maintain backward compatibility. In addition the reporting period of the EMI can be configured by an eNB. It could reuse similar feedback schemes as PMI reporting for backward compatibility. Instead of reporting the above error vector at one time, which is challenging if uplink control signaling resource is limited, a moderate number of bits may be reported in multiple report messages at multiple times. That is at predetermined times only a portion of the error vector information is reported. After a predefined reporting period, the eNB assembles the reported portions of the error vector and rebuilds the eigenvector. An eNB can apply this constructed eigenvector to achieve higher precision in precoding.

The bits representing the error vector can be sent in multiple messages. Each message can consist of different configured lengths of bits, depending on legacy PUCCH structure and scheduler preference. An eNB can re-assemble the received bits to reproduce the eigenvector with incremental accuracy. One approach is to feed back four bits at a time, which is consistent with the legacy PUCCH structure for Rel-8 PMI reports. Once the reported PMI is changed or after a predefined period, the EMI reporting procedure could be reset for synchronization to avoid feedback error propagations. After the reset, a new PMI and EMI reporting procedure may be restarted.

In accordance with a further embodiment of the present matter binary code reporting of the quantified error vector may be described as follows. Each real and imaginary number of the error vector is quantized and coded in a binary format with a leading sign bit. The quantized error vector is then reported to eNB.

This is shown graphically in FIG. 10, reporting of a sequence of bits of the quantized error. The UE reports the sign bits first followed by the most significant bits (MSBs) for all components of the error vector together. This allows the eNB to be able to reconstruct an approximation of quantized eigenvector as early as possible. In subsequent reports, less significant bits are sent consecutively, which would allow the eNB to further refine the approximation of the eigenvector. After all the bits have been reported, the UE can re-calculate the error projects and repeat the same process of reporting EMI again or the UE can enter a tracking mode as will be described later.

In accordance with a still further embodiment of the present matter integral reporting of the quantified error vector may be described as follows. In order to apply the most current eigenvector measurement in each EMI report, an integral reporting approach is proposed. This potentially reduces feedback delay. In this approach, each EMI report carries sign bits indicate the direction of difference between each projected error element (real or imaginary part) and the previously reported error value. The EMI is derived at a UE by using the most recent eigenvector. At the eNB the approximation of the eigenvector is refined by combining EMI reports as follows:

$$v_I = v_{PMI} + v_e = v_{PMI} + \sum_i \left[ \sum_{n=1}^{N} (\text{re}(i,n) + j*\text{im}(i,n))e(n) \right] b(i) \quad (1)$$

where, $v_I$ is the reconstructed eigenvector at the eNB at a reporting instance N, $v_{PMI}$ is the quantized eigenvector determined by the PMI reporting, n is the feedback instance of the EMI, i is the dimension index of the error vector, e(n) is the error step size at feedback instant n. Here, re(i,n) and im(i,n) are the real and imaginary sign bits of the i-th dimension of the error vector derived from EMI reporting at EMI reporting instance n. It takes value of 1 if the corresponding reported EMI bit is 1, and takes value of −1 if the corresponding reported EMI bit is 0. b(i) is the i-th dimension vector of the basis. At reporting step n, if the eNB receives a bit of "1", corresponding error vector projection will be increased by a factor of e(n); otherwise, it will be decreased by a factor of e(n). Using both PMI and EMI, the eNB can derive the error vector and derive the corresponding eigenvector for DL MU-MIMO scheduling and pre-coding. After multiple iterations, it is expected that $v_I$ converges to v, thus resulting in better eigenvector approximation. The error step size determines how fast the feedback converges. There are multiple ways to determine the error step size. One method is to use pre-configured values known to both eNB and the UE, in which the optimal step size could be determined offline through simulations. Another method is to adaptively feed back the step sizes from the UE to the eNB through higher layer signaling. An adaptive method is described here in which the error step size is determined dynamically at the UE by averaging the amplitude of all error numbers, for example, the averaging can be conducted as follows:

$$e = \left\lceil (0.5/I) \sum_{i=1}^{I} |\text{real}(A(i))| + |\text{imag}(A(i))| \right\rceil \quad (2)$$

where A(i) are the projected values to dimension i obtained at the EMI reporting instance, l is the dimension size of error vector, operator ⌈ ⌉ refers to the quantization operation, in which the closest predefined value is chosen, and |.| is the absolute value operation. This dynamically determined step size could be signaled to eNB through UL signaling as shown in FIG. 9 before EMI reporting starts and could be updated before consecutive EMI reporting. An optimal error step size reduces unnecessary feedback overhead, thus speeding up the convergence. The report of error step size can also use codebook approach. As an example, if two bits are used in this example, a mapping scheme shown in Table 1 may be used to signal the error step size:

TABLE 1

| 00→0.5 | 01→0.25 | 10→0.125 | 11→0.0625 |
| --- | --- | --- | --- |

The error step size can be either variable or fixed for each EMI report. An example on how the variable step size is used is shown in the plot of FIG. 11a. As shown the eNB increments the eigenvector by step size of 0.5 at the first step. In the second step, the eNB increments by step size of 0.25. In the third step, the eNB decrements by step size of 0.125. The corresponding reported EMI will be [1 1 0] corresponding sign functions of +1, +1 and −1. This process will continue as needed. In FIG. 11b there is shown a plot using a fixed step size. It can be seen that the reported error vector $v_e$ at each EMI report converges to target value monotonically. The corresponding reported EMI is [1 1 1] corresponding sign functions of +1, +1 and +1. After a number of EMI reports, it is expected that the quantized eigenvector will converge within a pre-determined threshold. Since the latest measured channel eigenvector is always used for the error vector calculation, the EMI tracks the small variations of the eigenvector between two adjacent PMI reports. If the variable step size is applied, after a particular number of steps, the step size should be set to a smaller value to allow effective eigenvector tracking. In another variable step size approach, instead of reducing the step size by half in the subsequent step, as described above, a larger step size reduction could be applied in order to achieve faster convergence. The optimal step size can be determined by the UE and signaled to eNB using a codebook approach.

The EMI reporting procedure at the UE can be summarized using the pseudo code bellow: A new EMI reporting starts whenever a new PMI is reported.
Integral EMI Reporting Procedure at UE:

---

1) initialize a set of projection values (i.e. the elements of the error vector) A(i, 0) = 0, where i = 1, ..., l, l is the dimension of the basis b(i), and b(i) is the vectors in the orthogonal basis which is determined by the PMI but excluding the PMI vector.
2) determine initial error step e(1)=e;
3) for each EMI report step number n (n>=1), and for each dimension i (i=1,...l)
{
    get the latest measured eigenvector at instance n, v(n);
    project it to selected basis to get a set of projection values A(i) = b(i)$^H$ v(n) and apply normalization;
    if step number n<= 3 (or other number as the threshold)
    {
      apply error step size e(n) as function of n (either fixed or variable);
    if real(A(i,n)−A(i,n−1)) >= 0,
      report EMI Bit "1" to indicate re(i, n)=1;
    else
      report EMI Bit "0" to indicate re(i, n)=−1;
    end if
      do similar processing for imaginary part imag(A(i,n)−A(i,n−1)) as above to report bit im(i, n);
    }
    else if step number n>3 (or other number as the threshold to enter tracking mode)
    {
      apply e(n) the same as the one in step number 3;
      report EMI using the same method as above (tracking mode now);
    }
    end if
    update A(i, n) = A(i, n−1)+(re(i, n)+j*im(i,,n))*e(n);
    update report step number n=n+1;
}

---

Use of the EMI Information at eNB Under the Integral Reporting Procedure:

---

1) initialize a set of projection values ( i.e. the elements of the error vector), A(i, 0)=0, where i=1, ..., l and l is the dimension of the basis b(i), and b(i) is the vector in the orthogonal basis that is selected by the PMI but exclude the PMI vector.
2) determine initial error step e(1)=e;
3) for each EMI report step number n (n>=1), and for each dimension l (i=1,...,l)
{
    receive reported EMI bit and determine error step size e(n);
    for real part of one projection, if this bit is 1, set re(i, n)=1; otherwise, set re(i, n)=−1; same processing applies for the imaginary part im(l, n).
    update A(l, n)=A(i, n−1)+(re(i, n)+j*im(i, n))*e(n);
    reconstruct the eigenvector v(n)=$v_{pmi}$+sum[A(i,n)*b(i)] over i;
    normalize the reconstructed eigenvector to norm 1;
    update report step number n++;
}

---

At the UE, once the PMI changes, the EMI reporting algorithm as described above is restarted (termed EMI resetting). There are two options regarding the re-starting procedure of PMI/EMI reporting. One option is to configure a fixed period for PMI/EMI reporting, and when the reporting period expires, re-start the reporting procedure. The second option is that every time when a different PMI is obtained by the UE after codebook searching for channel vector (or principle eigenvector) at each PMI reporting instance, the EMI reporting procedure is reset and restarts. An indication of re-starting the procedure could be determined at the eNB after it receives a different PMI from the previous reported PMI.

In accordance with a still further embodiment of the present matter a polar representation of the error vector is generated for reporting. This scheme is very similar to the integral reporting scheme described above in that the UE updates the latest eigenvector measurement in each EMI report. However, the representation of the elements of the error vector is in the polar plane instead of Cartesian plane. Rewriting equation (1) we have:

$$v_I = v_{PMI} + v_e = v_{PMI} + \sum_i Ap(i,n)b(i) \quad (3)$$

where Ap(i,n) denotes the projection of the error vector on the i-th dimension vector of the basis in the EMI feedback instance n. Here, we represent the complex number Ap(i,n) in the polar coordinate as follows:

$$Ap(i,n)=r(i,n)\exp(j\theta(i,n)) \quad (4)$$

where r(i,n) is the norm and θ(i,n) is the phase of Ap(i,n). Now, we can represent the norm and phase of Ap(i,n) instead of real and imaginary parts of A(i,n). For instance, assuming we want to represent Ap(i,n) with two bits. We can represent each component r(i,n) and θ(i,n) with one bit. Similar to the previous section, we can write:

$$r(i,n)=r(i,n-1)+Sr(i,n)*\Delta r(n) \quad (5)$$

$$\theta(i,n)=\theta(i,n-1)+Ss(i,n)*\Delta\theta(n) \quad (6)$$

where Δr(n) and Δθ(n) denote the step size for the norm and phase, respectively, and Sr(i,n) and Ss(i,n) denote the corresponding sign bits which are determined by:

$$Sr(i, n) = \begin{cases} 1 & r(i, n) > r(i, n-1) \\ -1 & \text{otherwise} \end{cases} \quad (7)$$

and

-continued $$Ss(i, n) = \begin{cases} 1 & \theta(i, n) > \theta(i, n-1) \\ -1 & \text{otherwise.} \end{cases} \quad (8)$$

For initialization, we can set r(i,0)=r* for some value r* to be optimized and θ(i,0)=π/2. Also, the step sizes for the norm and phase can be set to be fixed or variable. We can adopt the same algorithm as the one given in above with the defined initial values. Moreover, the reporting frequency for the norm and the phase can be set adaptively since normally phase report requires more bits than norm report. For instance, in one EMI report we can send one bit norm and one bit phase and the next EMI report we can allocate both bits to the phase report.

Figure 12:
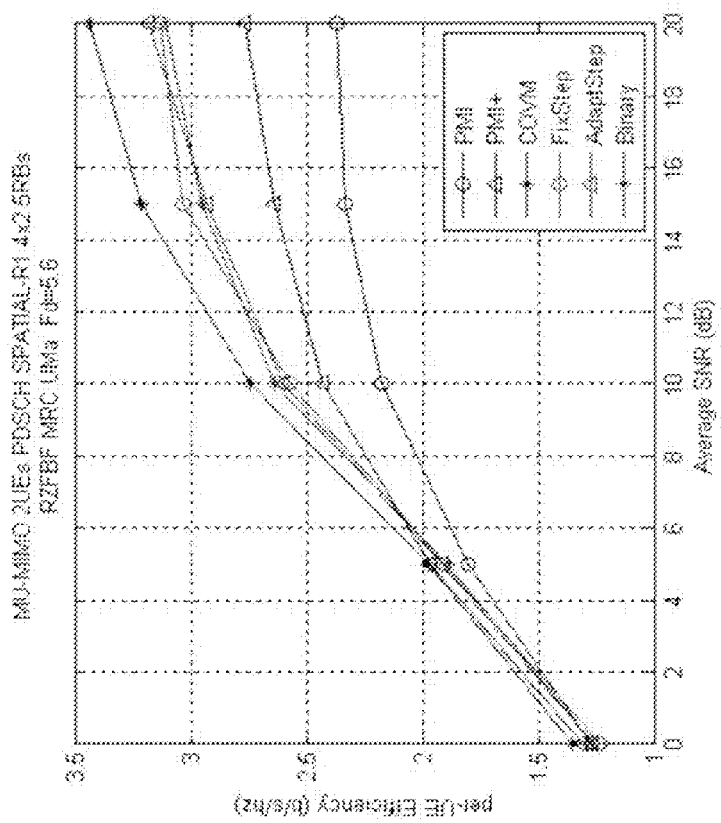
FIG. 12 is a graph of simulation results.

Referring now to FIG. 12 there is shown a Monte-Carlo link-level simulation results and simulation conditions for evaluating the performance of the feedback approach. A 4-by-2 DL MU-MIMO is assumed here. Simulation results using the new proposal with different methods described above are plotted, i.e., binary code reporting, variable step size integral reporting, and fixed step size integral reporting are presented. In the figure, solid (red) lines show results using the schemes described herein; dashed (blue) lines show results using existing schemes. In addition to the simulation results using schemes described herein, results with short-term (1 ms) covariance matrix without quantization, PMI+, and PMI methods are also included for comparison. In the PMI+ method, a PMI and a best companion PMI are reported to the eNB to perform MU-MIMO pairing.

Note that in the simulation, for newly presented schemes, the PMI is reported every 10 ms and the EMI is reported every 1 ms between two PMI reports. Each EMI report contains six bits. For existing schemes COVM, PMI and PMI+, the reports is happen every 1 ms.

As may be further seen from FIG. 12 the covariance matrix method provides the best throughput results, this is then used as an upper bound to compare other schemes. In addition, we can see that the PMI feedback method has the poorest throughput performance due to the quantization error and can be used as a lower bound in the comparison. It can further be seen from FIG. 12 that the performances of the current methods described herein are closer to that of the covariance matrix (COVM) method and much better than that of the Rel-8 PMI feedback methods.

In summary it may be seen that the present disclosure describes a flexible and efficient EMI feedback scheme with the following aspects:

1. The configurable feedback reporting of the EMI can reduce the error vector between actual eigenvector and the reconstructed eigenvector at eNB in a progressive manner. The EMI can be used as optional feedback information to improve reconstructed CSI accuracy at eNB and thus improve DL MU-MIMO performance.

2. The eNB has the flexibility to configure PMI and/or EMI reporting depending on the channel conditions and traffic loading. In low-mobility and highly-correlated scenarios, the rate of a regular PMI report could be reduced to support more EMI feedback reports in order to improve the CSI accuracy.

3. The additional EMI feedback could also be configured at high traffic loading situations when eNBs have a large number of UEs to be scheduled. With the additional EMI reports, the actual eigenvectors could be reconstructed by the eNB more accurately, and therefore would allow the eNB to form more accurate beams through precoding to improve MU-MIMO performance.

4. Backward compatibility could be achieved, i.e., eNB has the option of requesting UE to send PMI only reporting without sending any EMI reporting, or sending both reportings.

5. With a more accurately reconstructed CSI at the eNB, the MU-CQI (Channel Quality Indication) prediction would be more accurate at eNB based on SU-CQI feedback from the UE. It also leads to improved modulation and coding scheme (MCS) prediction accuracy, which leads to improved link adaption, and better pairing selection.

6. This approach can also be extended to support sub-band PMI feedback. For example, a wide PMI could be feedback, while PMI for each sub-band could be fed back using EMI reporting, namely, only feedback error vector between sub-band eigenvectors and wideband PMI. This could be especially effective in low frequency selective channels.

7. This approach could be applied simultaneously in both time and frequency directions that could be particularly effective for the low frequency selective channel and UE with low mobility.

8. The proposed approach can either progressively improve eigenvector accuracy at the eNB, or track eigenvectors for channel changes over time. The described approaches can be extended to high-rank PMI feedback. The approaches described herein can be extended to best companion PMI reporting. As the eNB collects more accurate eigenvector information from each UE, more accurate UE paring decisions can be made so as to improve the overall system performance.

9. Long-term covariance information may be incorporated with the approaches described herein to further reduce feedback overhead.

10. The approach can also be extended to support CoMP (Coordinated Multipoint) transmission. In this case, the transmit points to the UEs could be from different cells, namely, a serving cell and a number of coordinated cells. The serving cell of the UE could configure the PMI and EMI reporting of UE, and the PMI and EMI reporting could be sent to the serving cell. The reconstruction of eigenvectors could be done at the serving cell and distributed to coordinated cells. Alternatively, the PMI and EMI reported could be fed back directly to each coordinated cell which would be responsible for reconstructing its own CSI.

Figure 13:
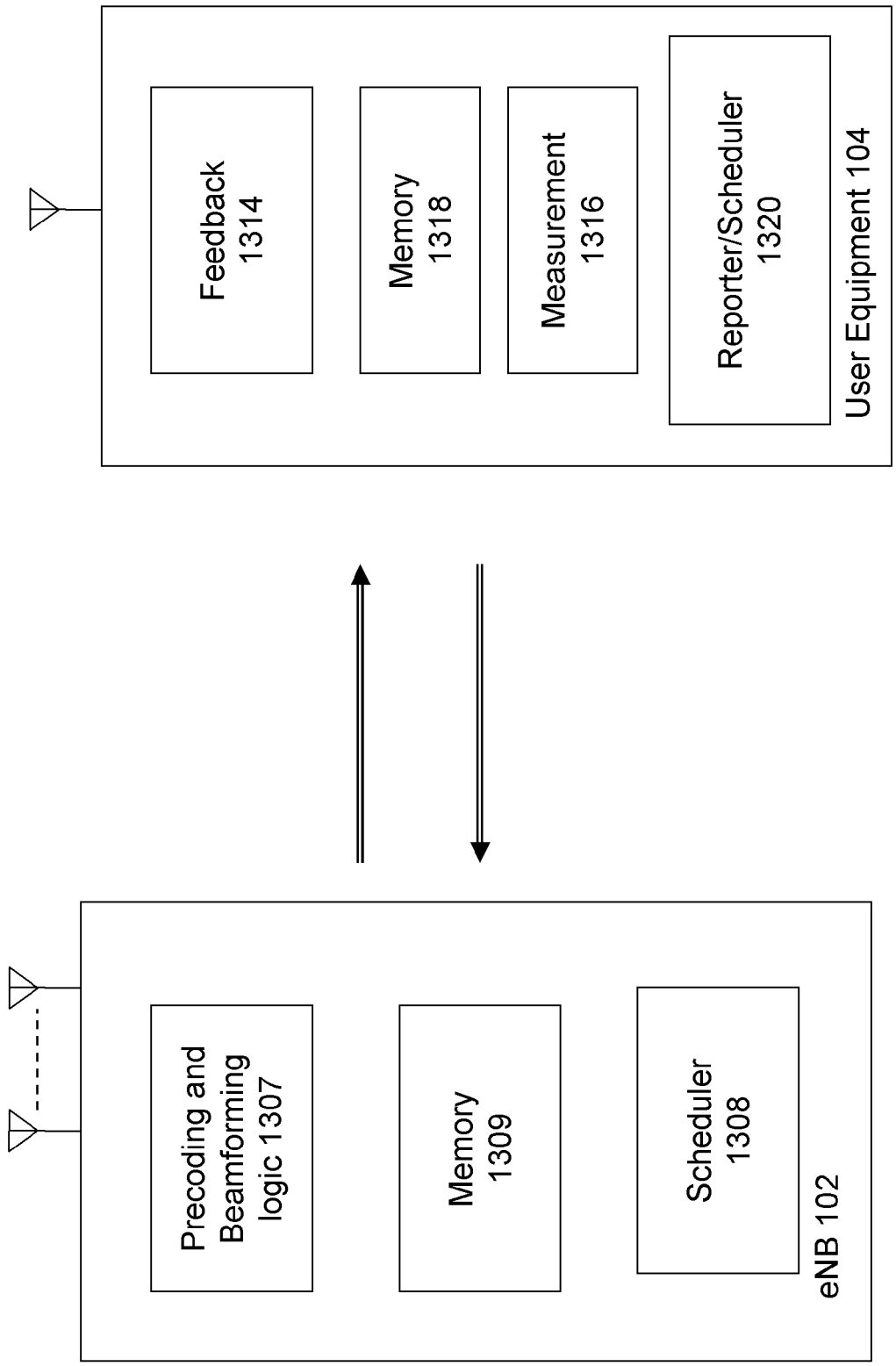
FIG. 13 is a block diagram of an exemplary UE and eNB according to the present matter

As will be appreciated, the above schemes can be implemented in any wireless communication system requiring accurate channel state information for beam forming or where link performance can be improved by adapting the transmissions to account for current channel conditions. Schemes involving conveying channel information between receiver and transmitter are normally referred as closed-loop methods. Referring to FIG. 13 there is a block diagram illustrating a mobile device and base station which can be used with preferred embodiments of the apparatus and method of the present application. An implementation of the base station 102 (eNB) includes precoding and beam-forming logic 1307 to maximize the signal level. The UE 104 can report the channel state information (CSI) back to the base station 102 to use for subsequent transmissions. In a closed-loop beamforming MIMO system, the eNB 102 utilizes the channel information feedback from the UE to form a beam towards the UE 104 using preceding weights (e.g., a pre-coding matrix extracted from the channel matrix). The base station (eNB) includes a scheduler 1008, which manages the scheduling of data and control information for transmission to the UE's 104.

A memory 1309 stores the preceding weights that are used for beamforming. Beamforming implies that multiple antennas are used to form the transmission or reception beam; in this way, the signal-to-noise ratio at the UE 104 is increased. This technique can both be used to improve coverage of a particular data rate and to increase the system spectral efficiency. Thus, beamforming can be applied to both the downlink and the uplink.

The UE includes a feedback module 1314 for conveying channel information, such as channel quality information (CQI) and channel state information (CSI), to the base station (eNB). As such, a measurement module 1316 provides for measuring parameters relating to state of the communication channel (e.g., downlink). This feedback mechanism provides information to enable the eNB to perform the closed-loop transmission on the DL with e.g., quantized channel response or quantized precoding weights. Further, a memory 1318 permits storage of precoding weights, as part of the closed-loop MIMO mechanism. The UE includes a scheduler 1320 to schedule transmissions on the uplink or to schedule feedback reporting as described herein.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for user equipment (UE) operation in a wireless communication system, the wireless communication system having a base station, the method comprising:
Measuring a channel between said UE and the base station;
Determining by said UE a quantized estimate of said measured channel by using a codebook to approximate said measured channel;
Computing an error measure for the quantized estimate said error measure being an error vector corresponding to a difference between said quantized estimate and said measured channel;
Projecting said measured channel onto a set of orthogonal basis-vectors wherein one dimension of said basis vectors of formed of at least said quantized estimate including basis information, while said error measure includes said projections onto remaining dimension of said basis vectors; and
Transmitting the error measure and the basis information for the quantized estimate to the base station for use by the base station in reconstructing an actual channel vector, said transmitting said error measure including prior to transmitting, representing a real component and an imaginary component of said error measure in binary format and initially transmitting sign bits followed by most significant bits of each said real component and said imaginary component.

2. The method as defined in claim 1, including determining an eigenvector of said measured channel.

3. The method as defined in claim 2, said eigenvector being a principal eigenvector taken from a singular value decomposition (SVD) of the measured channel.

4. The method as defined in claim 1, said error measure being transmitted in one or more messages.

5. The method as defined in claim 1, including transmitting subsequent bits of each of said components.

6. The method as defined in claim 1, said step of transmitting said error measure including transmitting sign bits for real and imaginary components of a difference between each projected error on each basis dimension of the set of orthogonal basis vectors and a previously reported error measure.

7. A method for base station operation in a wireless communication system comprising:
Receiving at said base station an error measure and information for a quantized estimate of a measured channel from a user equipment (UE), the quantized estimate being a codebook based approximation of the measured channel between said UE and the base station, said error measure being an error value corresponding to a difference between said quantized estimate and said measured channel; and
Reconstructing said measured channel at said base station by applying an error measure to said quantized estimate to derive a channel vector between said base station and said UE, wherein said error measure comprises a plurality of error messages each received at successive time intervals and said reconstructing including applying said error step size to said error messages to derive said error measure and then said channel vector.

8. The method as defined in claim 7, said channel vector is a principal eigenvector of the channel.

9. The method as defined in claim 8, including a step of assembling said plurality of received error messages into an error measure after each number of time intervals.

10. The method as defined in claim 8, including deriving said error measure at each successive time interval by combining error messages received at said successive time intervals.

11. The method as defined in claim 8, including receiving a quantized error vector and an error step size indicative of said quantization.

12. The method as defined in claim 11, said error step size indicative of said quantization being determined at said UE.

13. The method as defined in claim 8, said error step size being fixed and predetermined.

14. The method as defined in claim 8, said error step size being variable and predetermined.

15. The method as defined in claim 7, said error step size being applied for a predetermined number of steps of fixed or variable error step size, in a normal mode.

16. The method as defined in claim 7, including a tracking mode wherein another fixed small error step size is applied after a predetermined number of steps.

17. The method as defined in claim 1, said error measure being represented in polar coordinates.

18. A mobile device for operation in a wireless communication system, the wireless communication system having a base station, the mobile device comprising:
A processor configured to:
measure a channel between said UE and the base station;
determine a quantized estimate of the measured channel by using a codebook to approximate said measured channel;
compute an error measure for the quantized estimate; and
project said measured channel onto a set of orthogonal basis vectors wherein one dimension of said basis vectors is formed of at least said quantized estimate including basis information, while said error measure includes said projections onto said remaining dimensions of said basis vectors; and
transmit the error measure and the quantized estimate to the base station for use by said base station in reconstructing an actual channel vector said error measure being an error vector corresponding to a difference between said quantized estimate and said measured channel wherein said transmitting said error measure including prior to transmitting, representing a real component and an imaginary component of said error measure in binary format said initially transmitting sign bits followed by most significant bits of each said real component and said imaginary component.

19. A MIMO system comprising:

A mobile device, having a processor configured to:
- measure a channel between said mobile device and a base station;
- determine a quantized estimate using a codebook to approximate said measured channel;
- compute an error measure for the quantized estimate; and
- project said measured channel onto a set of orthogonal basis vectors wherein one dimension of said basis vectors is formed of at least said quantized estimate including basis information, while said error measure includes said projections onto said remaining dimensions of said basis vectors; and
- transmit the error measure and the quantized estimate to the base station for use by the base station in reconstructing an actual channel vector, said error measure being an error vector corresponding to a difference between said quantized estimate and said measured channel wherein said transmitting said error measure including prior to transmitting, representing a real component and an imaginary component of said error measure in binary format and initially transmitting sign bits followed by most significant bits of each said real component and said imaginary component.

20. The system of claim 19, wherein said base station includes a processor and a communication subsystem configured to:
- receive at said base station said error measure and said quantized estimate of a channel from the mobile device; and
- reconstruct said channel at said base station by applying said error measure to said quantized estimate to derive a channel vector between said base station and said UE.

* * * * *